United States Patent [19]

McCormick

[11] 4,161,646
[45] Jul. 17, 1979

[54] METHOD OF WELDING TUBULAR MEMBERS

[75] Inventor: Ronald O. McCormick, Columbus, Ohio

[73] Assignee: Owens-Corning Fiberglas Corporation, Toledo, Ohio

[21] Appl. No.: 813,997

[22] Filed: Jul. 8, 1977

[51] Int. Cl.² .............................................. B23K 9/00
[52] U.S. Cl. ....................................... 219/121 EM
[58] Field of Search ............... 219/121 LM, 121 EM, 219/60 A, 60 R

[56] References Cited

U.S. PATENT DOCUMENTS

| 3,016,449 | 1/1962 | Steigerwald | 219/121 EM |
|---|---|---|---|
| 3,401,253 | 9/1968 | Foster | 219/121 EM |
| 3,448,240 | 6/1969 | Steigerwald | 219/121 EM |
| 3,705,971 | 12/1972 | Jacovides et al. | 219/121 EM |
| 4,066,864 | 1/1978 | Heitmann | 219/121 EM |

*Primary Examiner*—J. V. Truhe
*Assistant Examiner*—Fred E. Bell
*Attorney, Agent, or Firm*—Ronald C. Hudgens; Philip R. Cloutier; Kenneth H. Wetmore

[57] ABSTRACT

Method of welding wherein at least two tubular members, are welded to a plate comprising directing a high energy beam welding means along a continuous path extending peripherally of the tubular members and between the tubular members.

5 Claims, 5 Drawing Figures

METHOD OF WELDING TUBULAR MEMBERS

BACKGROUND OF THE INVENTION

This invention relates to seal welding, that is, to the welding of a tubular member to a plate through which the tubular member extends, by welding around the periphery of the member. More specifically, this invention relates to method of making stream feeders or bushings for flowing streams of heat-softened mineral material, such as glass, and more specifically to a method of producing a stream flow section of tip plate of a feeder.

Endeavors have been made to fabricate a feeder tip section by drilling holes in a plate, inserting flange tubular members in the openings and electric resistance welding the flanges of the eyelet to the plate to form a tip section. The performed members provide a convenient way to make the necessary projections or tips. A method of this character is disclosed in the Leedy and Russell U.S. Pat. No. 2,933,590. In this method, a principal portion of the flange of a tubular member is fused during electric resistance welding. However, because the electrode is in direct contact with the fused metal of the member, there is a tendency for the member to become contaminated with metal of the electrode. Also, the heat generated may tend to warp or distort the performed tubular member or tip, and thereby change the size of the member passageway.

The use of preformed tubular members in feeder fabrication is desired because it has the potential advantages of uniform tips and ease of construction. Electron beam welding has been used to attach preformed tubular members to an orificed plate in a discontinuous tip by tip welding operation. Welding one tubular member at a time in a discontinuous operation has proven to be a slow and costly way of manufacturing feeder tip sections.

An improved method of manufacturing a stream feeder is desired.

SUMMARY OF THE INVENTION

The present invention provides a method of welding wherein at least two tubular members are welded to a plate comprising directing a high energy beam welding means along a continuous path extending peripherally of the tubular members and between the tubular members.

Accordingly, it is a principal object of the present invention to provide improved method of attaching orificed projections to a plate.

A further object of the invention is to provide a method of directing a high energy beam along a continuous path to weld a plurality of tubular members to a plate.

Still further objects of the invention and details of the method and apparatus in accordance with the invention will be apparent from the following detailed description when read in conjunction with the drawings.

DESCRIPTION OF THE PREFERRED EMBODIMENTS

Figure 1:
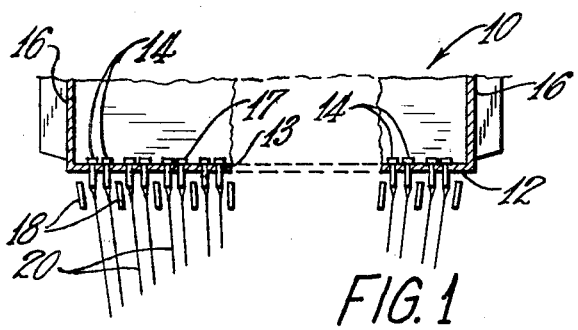
FIG. 1 is a longitudinal sectional view through a stream feeder.

FIG. 1 illustrates a stream feeder 10 embodying the invention which feeder is particularly adapted to contain heat softened mineral material, such as glass. The lower wall, or plate, 12 is provided with a plurality of openings 13 which accommodate tubular members 14 which are welded to the plate 12 though the utilization of the method of the invention. The feeder walls 16 and the plate 12 are typically fashioned of individual plates which are welded together by conventional fusion techniques.

In FIG. 1 the tubular members 14 are arranged in pairs of rows, and the rows are spaced to accommodate cooling fins 18 therebetween. The fins absorb heat from the glass streams 19 and filaments 20. The configuration is shown as an example as other arrangements and other cooling means can be used.

The tubular members 14 can be produced by conventional methods such as from small sections of tubes, or by methods like those described in the Matulewicz U.S. Pat. No. 3,579,807.

The circular openings 13 in the plate may be formed in any convenient manner which will accurately form the holes of the desired size and in the desired location without deforming or otherwise damaging the plate.

For satisfactory assembly of the tubular members and the plate, the tubular members are inserted into the holes 13. Care must be taken to assure that there is snug contact between the touching surfaces of the tubular member flange 17 and the plate 12. Since the holes 13 are so closely spaced, it is also imperative that the plate 12 be suitably supported during insertion of the tubular members. Method and apparatus as disclosed in U.S. Pat. No 4,001,542 can be used.

Figure 3:
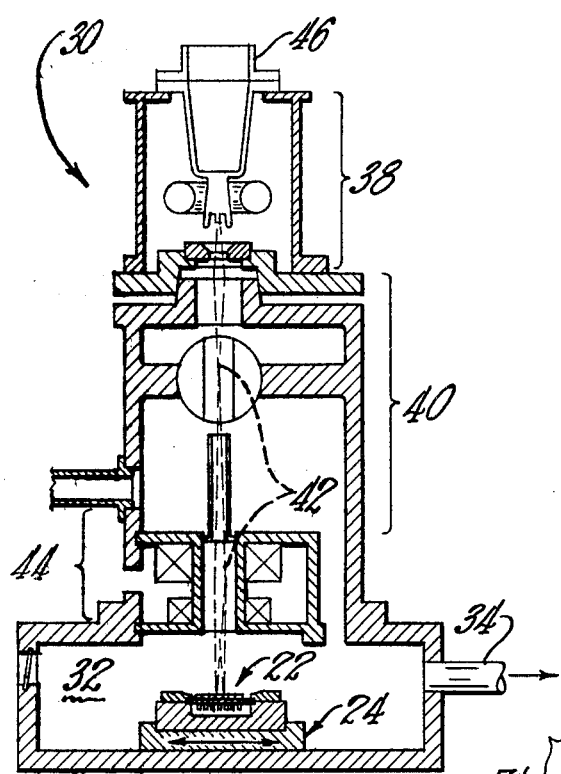
FIG. 3 is a sectional view through a high energy beam welding apparatus illustrating the arrangement of the feeder plate within the vacuum chamber.

As illustrated in FIG. 3, after the tubular members have been inserted into the openings of the plate, the assembly 22 of plate and tubular members is mounted in the fixture 24 for welding in the vacuum chamber 32 of the electron beam welder 30. Such commercially available electron beam welders typically comprise a vacuum chamber 32, a connection 34 to a vacuum pumping system (not shown), an electron gun 38, a beam column 40, a connection 46 to a high voltage source (not shown), a beam deflection system 44 and a control cabinet (not shown).

The electron gun 38 contains a heated tungsten filament which emits electrons. The electrons are concentrated to a small diameter beam by an electron optics system surrounding the beam column 40. An electronic deflection system is also provided to direct the electron beam 42 in the desired manner.

To perform the welding operation, the assembly 22 is placed in the fixture or work table 24 within the vacuum chamber 32. The welder positions the electron beam gun axially over the first eyelet to be welded. This positioning can be done by conventional control means, which can include means for adjusting the position of the work table and fixture 24 or electron beam gun assembly 38.

In the past, the practice has been to alternately scan or locate the center of each tubular member and then weld in a circular path around such tubular member flange. The circular path is conventionally machine set and the circular motion is effected by conventional electro-magnetic coil means. Any beam deflection required to locate the exact tubular member center is superimposed on the circular motion. The welding coincides with the circular deflection of the electron beam. At the completion of one welding cycle, the workplate and/or the electron beam gun unit is positioned at the next tubular member location and the cycle is repeated.

Since an electron beam weld at the optimum welding power level results in a cavity at the initiation and termination point of the weld bead produced, the power is usually programmed to be increased to the desired power level during the first portion of the welding cycle and to be decreased to a low level or zero during the final portion of the welding cycle. In the past, this practice of adjusting the power level has required that the circular motion of the weld path be continued for a rotation of approximately 720° so that at least one complete circular path is completed at the optimum welding power level. Using this discontinuous welding operation, tubular members have been welded to a plate at the rate of about four seconds per tip.

Figure 4:
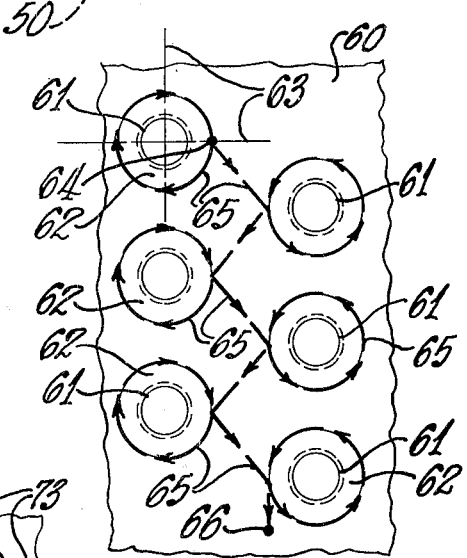
FIG. 4 is a partial top view of a feeder plate with tubular members positioned therein showing a continuous path along which the high energy beam can be directed according to the principles of the invention.
Figure 5:
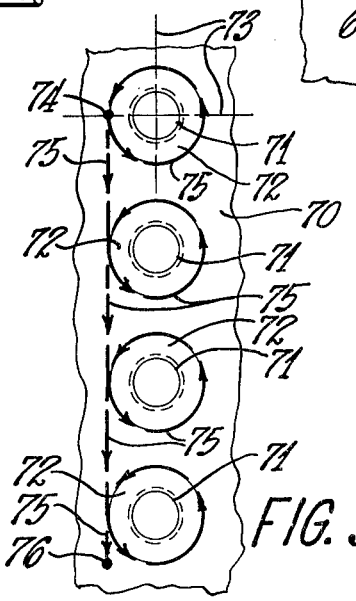
FIG. 5 is a partial top view of a feeder plate with tubular members positioned therein showing a continuous path along which the high energy beam can be directed according to the principles of the invention.

In the inventive method of welding tubular members to a plate, the first tubular member in a determined group is either manually or automatically scanned for exact location purposes. The electron beam welding machine is then automatically switched to a contour or continuous path mode. All of the tubular members in the group are welded by means of programming the electron gun unit and/or the workplate fixture to create a continuous weld bead along the desired weld path. FIGS. 4 and 5 show examples of continuous weld paths that can be used. After the selected group of tubular members has been welded, the power of the electron beam is then reduced. The electron beam welding machine switches to the scan mode and the first tubular member in the next group of tubular members is positioned for location scanning and the welding cycle is repeated. By welding in this way, only the first tubular member of a group is scanned which eliminates the time required for scanning each of the remaining tubular members in the group. Also, the power of the electron beam is increased to the optimum welding power level only during the welding of the first tubular member. Thereafter, the optimum welding power level is maintained throughout the welding of the other tubular members in the group. The power is reduced after the final tubular member has been welded in the desired group. Tubular members have been welded to a plate using the above described operation at the rate of about 1.5 seconds per tip.

FIG. 4 shows a continuous path the electron beam can be directed along in welding groups of tubular members 61 to the plate 60. The welding apparatus scans (simulated by the dashed cross pattern 63) the first tubular member and the electron beam is positioned on the flange 62 of the first tubular member and the welding is begun at position 64. The beam is directed along the peripheral edge of the flange of the first member and continues in a continuous path 65 along the flange of the first member, then moves to the second tubular member and is directed along the flange of the second member, thus forming a "figure 8" shaped path. The electron beam is directed along the continuous path 65 from position 64 to position 66, to weld all of the tubular members in the group to the plate.

FIG. 5 illustrates an alternate continuous path the electron beam can be directed along to weld groups of tubular members 71 to the plate 70. The electron beam welding apparatus scans the first tubular member (simulated by the dashed cross pattern 73) to position the electron beam on the flange 72 of the first tubular member of the group. The welding operation is then begun at position 74 with the electron beam being directed along the flange of the first tubular member to weld the tubular member to the plate. The electron beam is then directed along continuous path 75 to a second flange where the beam is directed along the flange of the second tubular member. The electron beam continues to be directed along its path 75 from position 74 to position 76 until all of the tubular members in the group have been welded to the plate.

Figure 2:
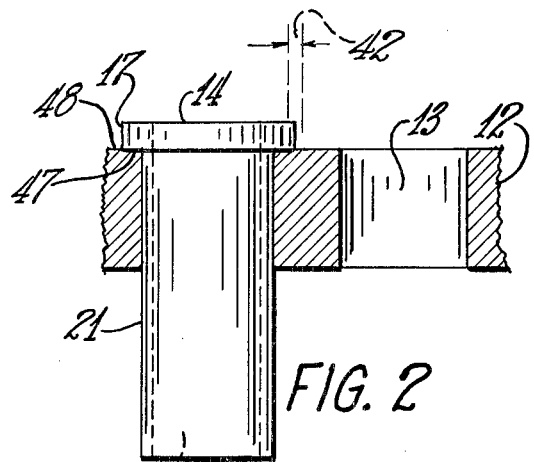
FIG. 2 is an enlarged fragmentary sectional view showing a tubular member in position to be welded to the feeder plate.

FIG. 2 shows an enlarged view of tubular member 14 positioned in orifice 13 for electron beam welding to the plate 12. The flat, laterally extending flange surface 47 of the tubular member 14 is in intimate contact with the flat surface 48 of the plate 12 when the tubular member is fully inserted in the orifice.

The dashed lines 42 indicate a preferred width for the electron beam 14, a width in which beam 42 overlaps the outer circumferential region of the flange 17 and the plate 12 so that the center line of the beam 14 is at the outer edge of the flange 17. The beam 42 overlaps the flange and the plate so that one half of the width of the beam strikes the flange and the other half of the width of the beam strikes the surface 48 of the plate immediately adjacent the outer edge of the flange. The welding must be done carefully so that the continuous peripheral flange welds are made without distorting the dimensions of the tubular member passageway 50. This requires a high degree of precision. In this regard, it is important to keep the beam 42 away from the interior diameter of the flanges 17. Process variables such as the power of the electron beam, speed of beam movement, and beam width are important; these variables must be selected to effect the continuous outer edge flange weld, but yet keep the dimensions of the tubular member passageway 50 stable or unchanged from the thermal effects of welding. This normally means no fusion is affected between a tubular member and the plate at the interior peripheral edge of the flange.

Although electron beam welding has been discussed in detail, other high energy beams may be used to effect the welding operation. For example, a laser beam can be used.

While certain preferred embodiments of the invention have been specifically disclosed, it is understood that the invention is not limited thereto as many variations will be readily apparent to those skilled in the art and the invention is to be given its broadest possible interpretation within the terms of the following claims.

I claim:

1. In a method of welding wherein a group of tubular members are welded to a plate, the improvement comprising:
   directing a welding beam along a continuous path extending peripherally of the tubular members and between the tubular members.

2. In a method of forming a stream feeder wherein at least two tubular members having a flange and a shank are welded to a plate, the improvement comprising:
directing a welding beam along a continuous path extending peripherally of and between each flange of the tubular members to weld each flange to the plate.

3. The method of claim 2 wherein the beam simultaneously contacts a flange and the plate.

4. The method of claim 2 wherein the beam is directed along the flange of a first member and along the flange of a second member to form a figure eight shaped path.

5. In a method of forming a stream feeder wherein first and second tubular members, each having a flange and a shank, are welded to a plate, the improvement comprising:
(a) directing a welding beam along the flange of the first member;
(b) increasing the power of the welding beam from a first level to a second level;
(c) maintaining the welding beam at the second power level as the welding beam is moved first along the flange of the first member in a complete circuit to weld the flange to the plate and then moving the beam from the flange of the first member to the flange of the second member, and then along the flange of the second member in a complete circuit to weld the flange to the plate; and
(d) decreasing the power of the welding beam from the second level to a third level.

* * * * *